UNITED STATES PATENT OFFICE.

GEORGE T. LEWIS, OF PHILADELPHIA, PENNSYLVANIA.

PROCESS OF PREPARING OXID-OF-ZINC PIGMENT.

SPECIFICATION forming part of Letters Patent No. 556,509, dated March 17, 1896.

Application filed November 27, 1894. Serial No. 530,107. (No specimens.)

*To all whom it may concern:*

Be it known that I, GEORGE T. LEWIS, a citizen of the United States, residing in the city and county of Philadelphia, in the State of Pennsylvania, have invented a certain new and useful Improvement in Processes of Preparing Oxid-of-Zinc Pigment, of which the following is a true and exact description.

My invention relates to the preparation of oxide of zinc for use as a pigment, and is especially applicable to such zinc oxide as is contaminated in the process of its manufacture by the admixture of zinc sulphate and zinc sulphite. In my Patent No. 502,822 of August 8, 1893, I have described and claimed an improved process for treating such zinc oxide, the same consisting in treating the impure zinc oxide with water containing a caustic alkali soda-ash or similar compound in solution for the purpose of converting the sulphur salts of zinc into zinc oxide. In carrying out this process, however, I have found difficulty in eliminating water and sulphates held in solution without at the same time injuring the oxide of zinc for use as a pigment, and the object of my present invention is to get rid of the water after the treatment without injuring the zinc oxide for use as a pigment.

I have discovered that by mixing with the oxide of zinc, treated as above, oil in sufficient quantity to form a paste-paint or pigment, and thoroughly incorporating the oil with the zinc oxide, the water and salts held in solution therein will be driven out from its admixture with the zinc oxide, the said zinc oxide forming a paste-paint with the oil, and the water collecting on top thereof, and that by this treatment the zinc oxide is converted into a paste-paint of excellent quality, and free from the defects which are apt to occur when the water is eliminated by other processes.

In carrying my invention into effect I prefer to first remove the larger portion of the solutions of sulphate of soda or like salt with which the zinc oxide is in admixture, and then adding the oil to grind or energetically stir the wet oxide with it until the oil is thoroughly incorporated therewith, at which time the water, together with the salts held in solution thereby, will be found to be thoroughly eliminated, so that it will separate from the mixture of oil and oxide. Said mixture can then be withdrawn from the bottom of the mixing-chamber or the water can be tapped off from the top thereof.

Having now described my invention, what I claim as new, and desire to secure by Letters Patent, is—

The method of treating zinc oxide containing sulphate and sulphite of zinc in order to fit it for use as a pigment, which consists in treating the impure zinc oxide with water containing a caustic alkali or its equivalent in solution whereby the sulphur salts of zinc may be dissolved by the water and the zinc combined with sulphur reprecipitated by the alkali then thoroughly mixing with the wet zinc-oxide pulp thus produced oil in quantity sufficient to form a paste-pulp with the zinc oxide in order to expel the water and soluble salts from the pulp, and then removing the aqueous solution of salts forced out by the oil to provide a commercially-salable paste-paint.

GEORGE T. LEWIS.

Witnesses:
H. B. RIANHARD,
C. B. RIANHARD.